United States Patent [19]

Pax et al.

[11] Patent Number: 4,751,712
[45] Date of Patent: Jun. 14, 1988

[54] VARIABLE FREQUENCY SHORT CAVITY DYE LASER

[75] Inventors: Paul H. Pax, San Francisco; Pay H. Chiu, Milpitas; H. Laurance Marshall, Palo Alto; James Henden, Sunnyvale, all of Calif.

[73] Assignee: Quantel International, Santa Clara, Calif.

[21] Appl. No.: 899,497

[22] Filed: Aug. 22, 1986

[51] Int. Cl.[4] .............................................. H01S 3/20
[52] U.S. Cl. ...................................... 372/54; 372/20; 372/99
[58] Field of Search ...................... 372/20, 53, 54, 92, 372/99, 107, 108; 350/610, 611, 608

[56] References Cited

U.S. PATENT DOCUMENTS

| 3,581,227 | 5/1971 | Podgorski | 372/107 |
| 3,675,157 | 7/1972 | Kaminow et al. | 372/53 |
| 4,091,274 | 5/1978 | Angelback et al. | 250/201 |
| 4,143,946 | 3/1979 | Leo et al. | 350/610 |
| 4,404,679 | 9/1983 | Chiu et al. | 372/107 |
| 4,475,201 | 10/1984 | Chiu | 372/53 |
| 4,492,431 | 1/1985 | Eitel et al. | 350/611 |
| 4,556,979 | 12/1985 | Scott et al. | 372/20 |

OTHER PUBLICATIONS

Kortz et al., "Generation of High Energy Tunable Picosecond Pulses," *Proceedings of the SPIE*, vol. 533, pp. 32-37, (1985).

*Primary Examiner*—James W. Davie
*Assistant Examiner*—B. Randolph
*Attorney, Agent, or Firm*—Majestic, Gallagher, Parsons & Siebert

[57] ABSTRACT

A dye laser system especially useful for generating short pulses in response to excitation laser pulses directed to an appropriate dye contained between opposing mirrors that form a short cavity within a small, easily replaceable cell. The spacing of the mirrors is adjustable by application of a force from outside of the cell, thereby allowing control of the frequency of the laser output. The cell is self-contained, including a dye reservoir maintained in continuous liquid communication with the cavity for providing fresh dye to it.

14 Claims, 4 Drawing Sheets

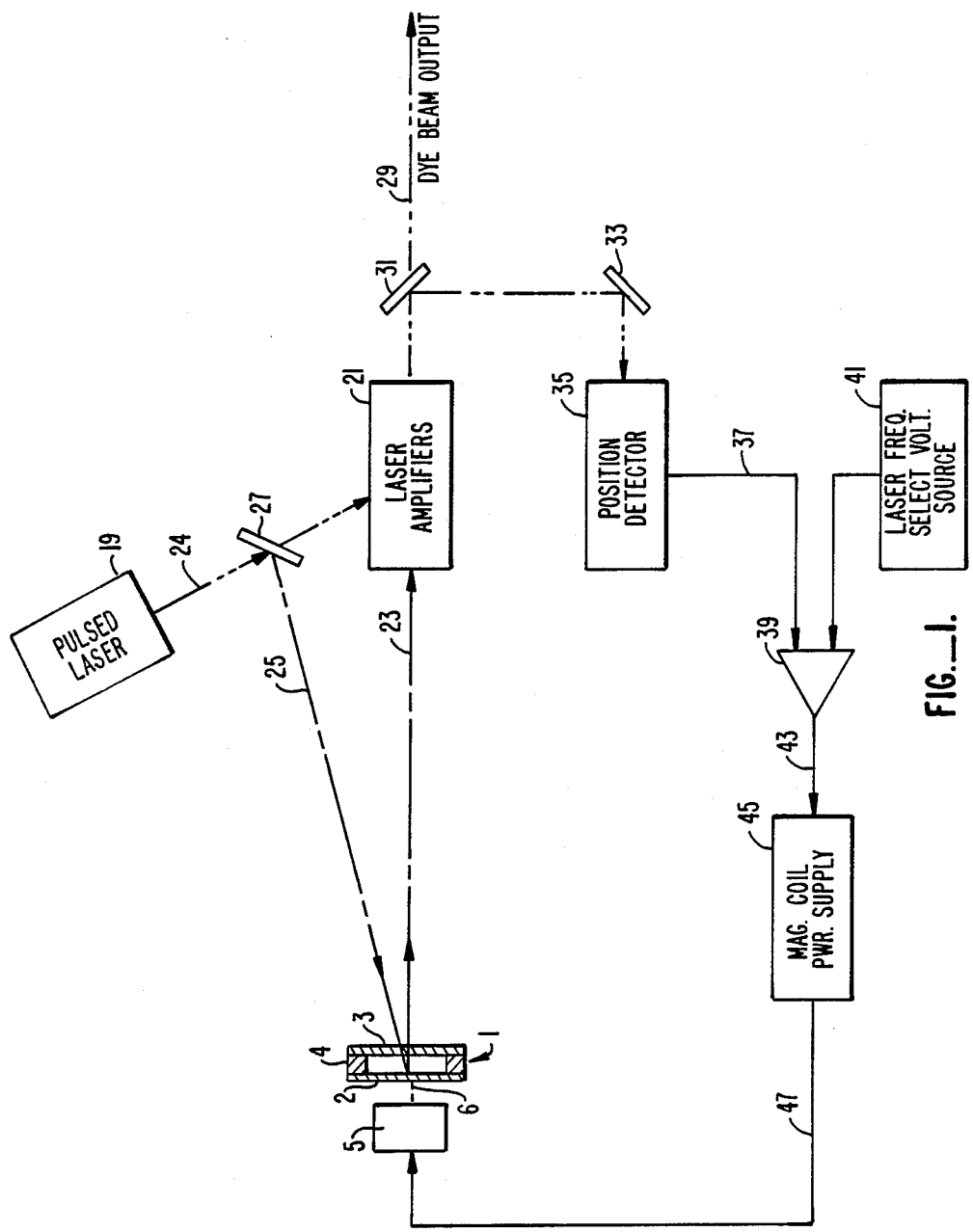
FIG._1.

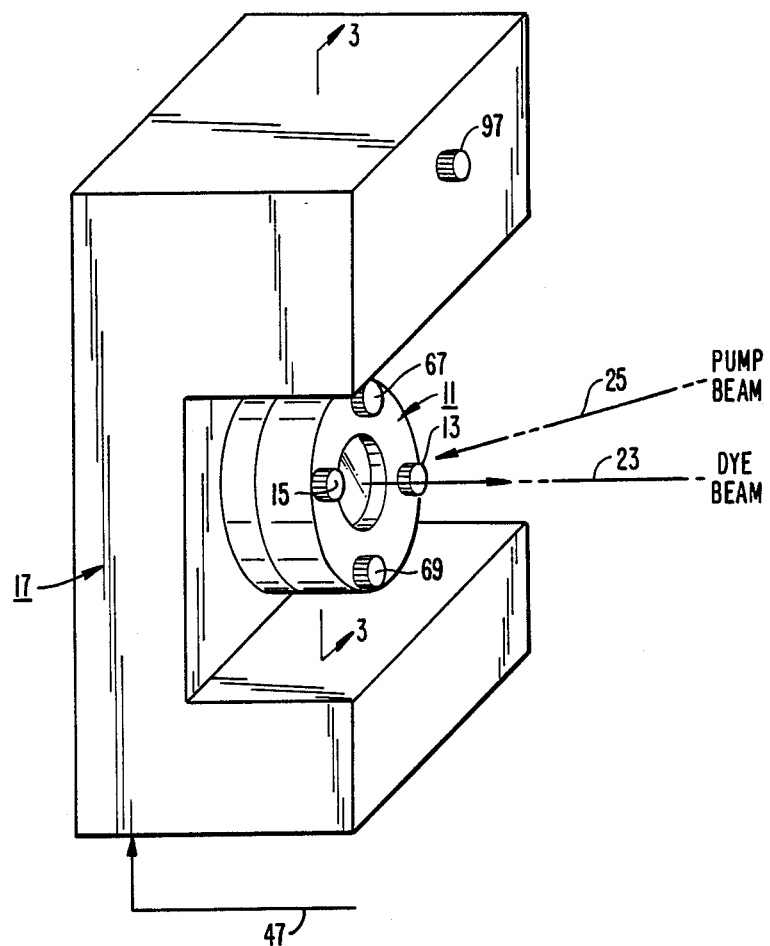
FIG._2.

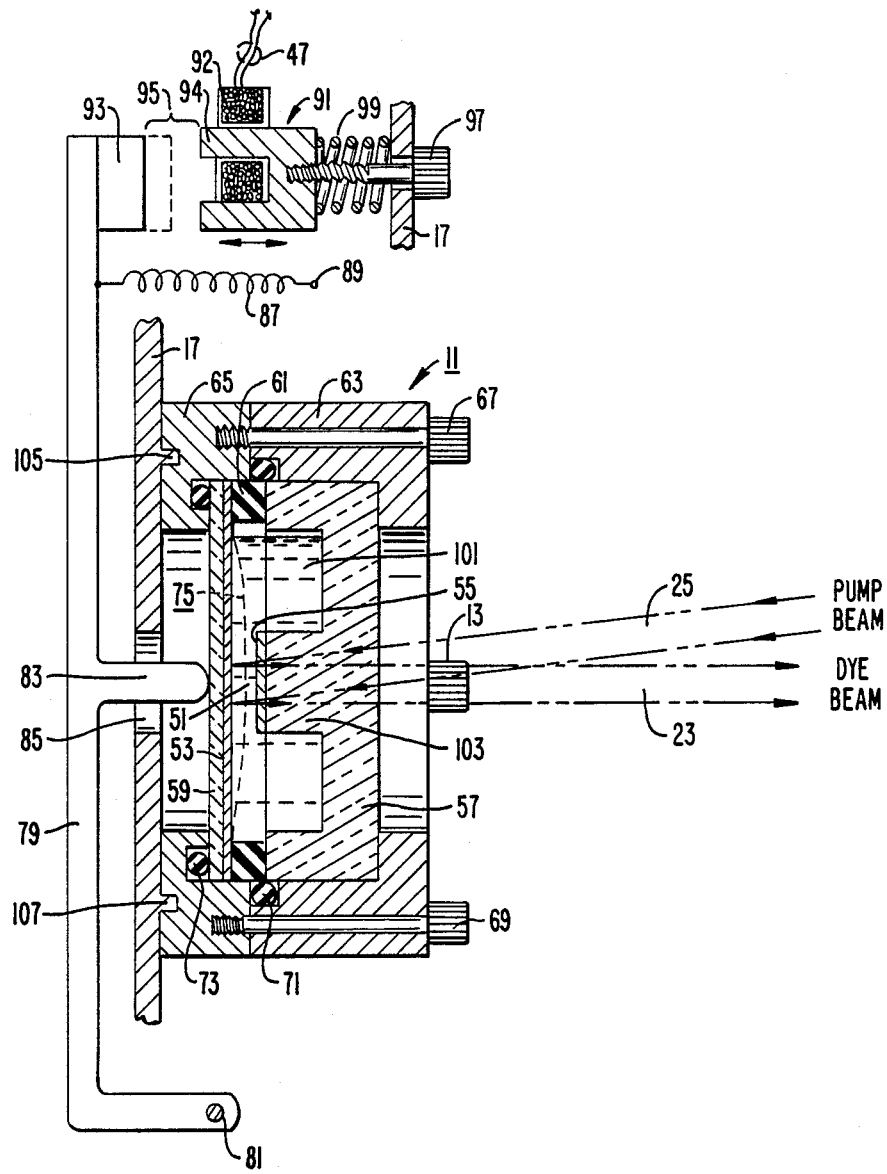
FIG._3.

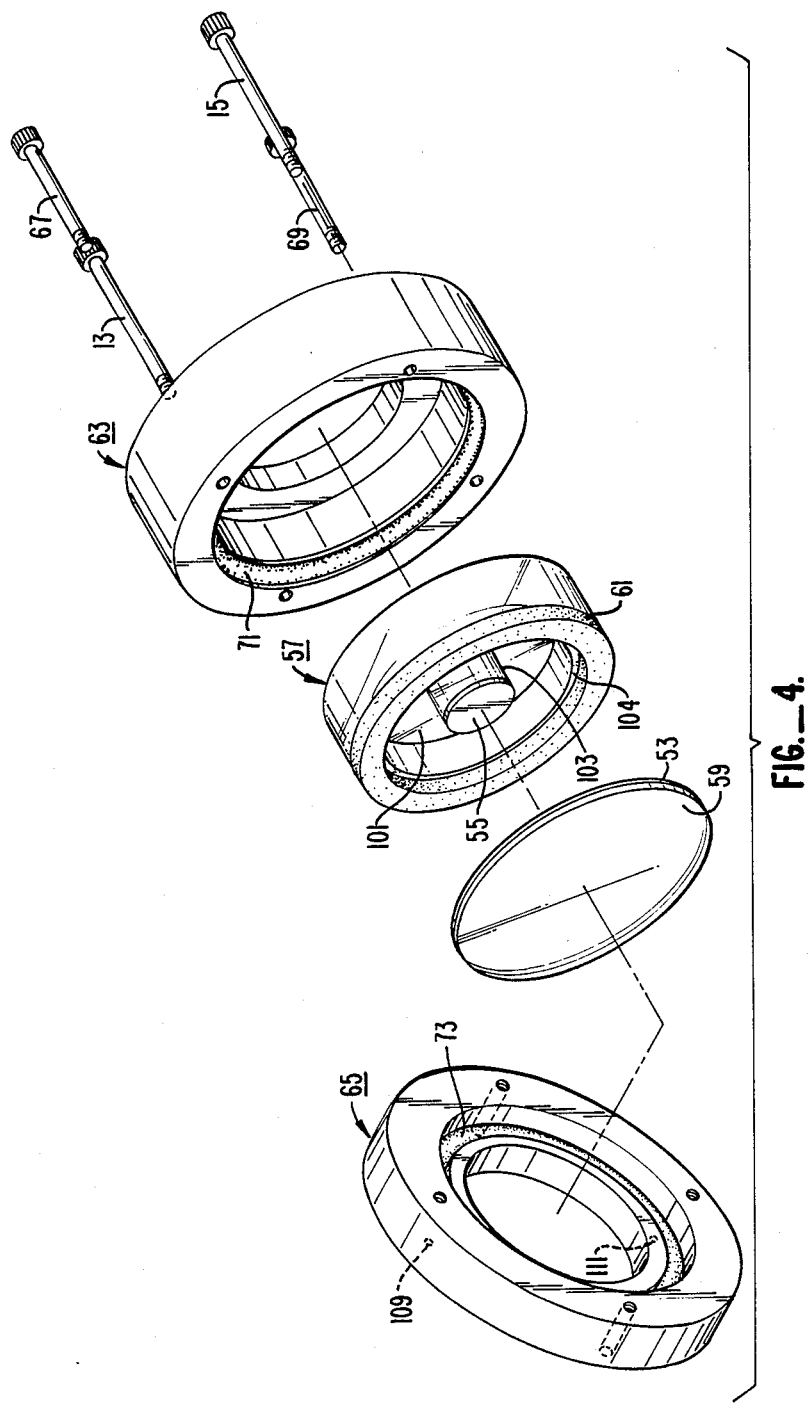

VARIABLE FREQUENCY SHORT CAVITY DYE LASER

BACKGROUND OF THE INVENTION

This invention relates generally to lasers, and more specifically to a variable frequency dye type of laser that utilizes a short resonating cavity.

As is well known, a laser usually employs, as a central element, a pair of mirrors between which is positioned a light amplifying medium in solid, gas or liquid form. An optical cavity formed by the mirrors causes standing light waves to be generated between them and amplified by the laser medium. The frequencies of the standing waves depend, in part, upon the spacing between the mirrors, and thus the laser output frequencies are controlled by the mirror spacing.

Multiple frequency (multi-mode) oscillation is common, but more recently short cavity dye lasers have become commercialized. The resonant cavity mirrors are spaced apart only a few microns and result in a single oscillating mode because of such close spacing. The light amplifying medium in the cavity is a liquid dye. This type of laser is most appropriately used to emit short pulses of coherent light. The dye medium is excited to lase by application of a pulse of intense light from another, more conventional laser.

The frequency of the single mode output of such a dye laser can be adjusted by varying the space between the two mirrors. Manual adjustment of such spacing has previously been suggested, but this is difficult to achieve because of the very small mirror spacing variations that are involved. An improvement over the manual adjustment is a suggestion of an electrically driven piezoelectric transducer attached to one of the mirrors for moving it. Such a system is disclosed in U.S. Pat. No. 4,556,979-Scott et al. (1985). However, the laser dye cell structure suggested in that patent has been found to be difficult to implement in a practical dye laser device. Specifically, its piezeoelectric transducer provides a displacement of one mirror as a unit relative to the other, a characteristic that renders difficult and unreliable the initial adjustment of the very short distance between the mirrors as well as the replacement of dye material.

Accordingly, it is a primary object of the present invention to provide a tunable short cavity dye laser that is simple and compact in structure, reliable, easy to use, and which provides repeatable results.

SUMMARY OF THE INVENTION

This and additional objects are accomplished by the various aspects of the present invention, wherein, generally and briefly, a small, self-contained, replaceable cell is provided in which the mirrors forming the laser cavity and the laser dye are contained. A reservoir of dye is provided adjoining the cavity so that awkward fluid connectios into or out of the cell for replacing dye, are unnecessary. The cell can be easily removed from the laser instrument and replaced by hand whenever the dye in the cell needs to be replaced, or when a cell with a different dye in it is desired to be substituted into the laser instrument.

According to another aspect of the invention, in one form, the frequency of the single mode output is made variable by providing one of the mirrors within the cavity on the inside of a cell wall that is resiliently deformable. A mechanism is then provided as part of the laser instrument for applying force against the deformable wall in order to controllably decrease the spacing between the mirrors, and thus change the frequency of the laser light output. When force is not applied to the deformable wall, it returns to a rest position that provides a predetermined, initial spacing between the two mirrors. Therefore, when a new cell is mounted into the instrument, its light frequency output, absent any force being applied to the deformable wall, is a known quantity. The output frequency can then be adjusted from that initial frequency to whatever is desired within the range of the cell. Such an application of force to the mirror, rather than by the mirror displacement that is present in the case of the piezoelectric driver arrangement discussed above, improves the repeatability of results when cells are interchanged because the force applied, and therefore the distance between the mirrors, can be made relatively independent of the fixed distance between the cell and a structure to which it is attached.

Additional objects, advantages and features of the various aspects of the present invention will become apparent from the following description of a preferred embodiment thereof, which description should be taken in conjunction with the accompanying drawings.

BRIEF DESCRIPTION OF THE DRAWINGS

FIG. 1 is a schematic diagram of the improvement of the present invention in a complete laser system;

FIG. 2 illustrates generally a preferred form of the improved dye laser cell of the system of FIG. 1;

FIG. 3 is a sectional view of the cell and cooperating components of FIG. 2, taken at Section 3—3 thereof; and FIG. 4 shows an expanded view of the main components of the laser dye cell of FIGS. 1-3.

DESCRIPTION OF A PREFERRED EMBODIMENT

Referring initially to FIG. 1, a tunable dye laser cell 1 is a central component in a laser system. Two opposing mirror structures 2 and 3 are held a fixed distance apart around their edges by a spacer 4. A resonant cavity is thus formed internal of the cell 1, which cavity is filled with a laser dye. A mechanism 5 applies a force to the center of the mirror element 2 through a mechanical connection 6. Such a force causes the mirror element 2 to bend inward toward the mirror 3 a distance controlled by a level of electrical power in a control circuit 47. The laser is thus tuned by controlling the spacing between the mirrors 2 and 3 in a region where the dye is caused to lase.

The remaining primary components of a complete laser system with which the dye cell 1 is utilized will now be described with respect to FIG. 1. A pulsed laser 19 of a standard, commercially available type is utilized as part of the laser system to excite dye within the cell 1 to fluorescence. Because the energy that can be developed in the laser dye cell 1 is limited by the threshold of damage of the mirrors 2 and 3 and by a preferred diffraction limited emission behavior of the laser, nearly all the intensity of the pulsed laser 19 is applied to amplifiers 21 that receive an output pulse from the dye laser cell 11. That pulse is generated in response to a pulse being applied by a beam 25. A beam splitter 27 directs only a very small part of the intensity of an outbeam 24 from the laser 19 to cell 11 since that is all that is necessary to generate the pulse output from the cell 1. This system permits the generation of pulses having a duration of only a few picoseconds, if desired.

The laser amplifiers 21 preferably include several stages, as is well known. The output of the amplifiers forms a beam 29 that is the output of the laser system. A very small part of that output intensity is deflected by a beam splitter 31 for use in determining and setting its frequency. FIG. 1 shows a feedback control loop for setting and controlling the output frequency of the dye laser cell 11. The small portion of the output intensity reflected by the beam splitter 31 is directed to a reflective diffraction grating 33. A first order diffracted beam is then applied to a position detector 35 that has an electrical signal output in a circuit 37. Since light is diffracted by the grating 33 at an angle which is dependent upon its frequency, a position sensing detector 35 can generate a signal having a value that is a function of the diffraction angle and therefore of the frequency of the output beam 29.

That frequency signal is applied to one input of an operational amplifier 39. Another input of the amplifier 39 comes from a voltage source 41, the level of which can be set by the operator of the laser system in order to obtain the desired laser output frequency. Any differences in voltage levels applied to the two inputs of the amplifier 39 cause an error voltage in an output circuit 43. This error voltage is used to drive a power supply 45 having an output circuit 47 that carries a voltage and/or current necessary to drive a frequency controlling mechanism within the case 17, as described below. The energy level in the circuit 47 is proportional to the error voltage in the circuit 43. Therefore, any difference between the frequency of the laser output beam 29 and that specified by the operator by setting the voltage source 41 is detected as an error voltage. A mechanism within the housing 17 changes the frequency of the output of the cell 11, in a manner described below, to minimize the error and give the desired output frequency. Since the frequency is ultimately controlled by the grating, the frequency or the laser can as well be adjusted by rotating the grating.

Referring to FIG. 2, a preferred form of the dye cell of FIG. 1 is illustrated. A tunable dye laser cell 11 is removably attached by hand operated operable screws 13 and 15 to a frame or case 17 that is permanently attached to a main chassis (not shown) of the laser instrument. The case 17 contains a mechanism for controlling the output frequency of light from the dye cell 11 by applying a controlled force to the cell.

Referring to FIGS. 3 and 4, the detailed structure of the cell 11 and of its force applying mechanism, according to a preferred embodiment, will be described. The cell 11 forms a resonant cavity 51 between a totally reflecting mirror 53 and a partially reflecting mirror 55. It is the liquid dye within this volume that is caused to lase by the pumping beam 25 being focused into it through the partially reflective mirror 25 and a transparent wall 57 to which the mirror 55 is attached. Because of the small distance between the mirrors 53 and 55, the dye will lase at only a single frequency that is passed through the partially reflective mirror 55 as the cell's output beam 23. Of course, the dimensions in the drawings are exaggerated in order to explain the structure and operation of the cell 11.

The totally reflective mirror 53 is carried by a wall 59 of the cell 11. This wall and the mirror 53 are generally flat and attached to the other wall 57 around its edges through a spacer 61. The spacer 61 is preferably attached to the wall element 57. The wall 59 is preferably allowed to be removed in order to reach the inside of the cell for replacing the liquid dye in it, since the cell is otherwise sealed. This is accomplished by holding the walls 57 and 59 together by two rigid frame elements 63 and 65, preferably made of metal, which are removably attached to each other by hand operated screws 67 and 69. Thus, as can best been seen from FIG. 4, the internal cavity of the cell may be accessed by separating the frame elements 63 and 65 after the entire cell 11 has first been removed from attachment to the frame 17. In order to provide a liquid tight seal, flexible O-rings 71 and 73 are provided, respectively, in grooves of the cell frame elements 63 and 65. Another arrangement of the same structure could be by optical contact of the spacer with the two mirrors.

Thus, the walls 57 and 59 of the cell are rigidly held together by the frame 63, 65 at their edges at distance apart controlled by the thickness of the spacer 61. The active laser cavity is, however, in the middle of the cell, a distance from these attached edges. In order to conveniently permit adjustment of the space between the two mirrors 57 and 55, the wall 59 is made of a material and thickness to be resiliently deformable into the cell cavity, such as indicated by a deformed position 75 shown in dotted outline. The wall 59 is additionally preferably characterized by returning to its planar position shown in FIG. 3 when such force is removed. The force is applied where the resonant cavity 51 exists. The resonant cavity 51 is thus positioned a distance from any attachment of the wall 59 to the wall 57 to allow such deformation.

Because of the small distances involved, it has been found that the deformation does not undesirably change the curvature of the totally reflective mirror 53 enough to alter the operation of the laser device. The bending of the wall 59 merely places the mirror 53 closer to the mirror 55, thus changing the characteristics of the resonant cavity. When the force is removed, or when a cell is first attached to the housing 17, the dimensions of the resonant cavity are known and thus the initial frequency of the output laser beam is fixed by those dimensions. It is only while force is being applied against the deformable wall 59 from outside the cell 11 that the frequency of the output laser beam is changed as a result of shortening the distance between the mirrors 53 and 55.

There are many ways in which such force may be applied against the wall 59. One way is simply by some mechanical device, such as a compressed spring. Another is by a mechanical device in the nature of a scale that can receive a weight placed on it proportional to the amount of force that is desired to be applied to the wall 59. Another utilizes a gas or other fluid pressure in a chamber against which the cell 11 is firmly urged by attachment to the frame 17. Increasing the fluid pressure increases the amount of deformation.

However, a preferred system for applying such force is an adjustable electromagnetic mechanism provided within the frame 17, the essential components of which are shown in FIG. 3. An elongated rigid beam 79, preferably made of metal, is vertically held at one end to pivot about pin 81 that is fixed to the frame 17. Intermediate of the beam's end is a piece 83 that extends outward of said frame 17 through an opening 85 therein. The piece 83 is positioned to contact the outside of the deformable wall 59 at the location of the resonant cavity 51 for applying the required force to deform the wall 59, when the beam 79 is rotated clockwise (according to FIG. 3) about the pin 81. In order to gently hold the pusher element 83 against the wall 59, a weak spring 87 is held in tension between the beam 79 and a pin 89 attached to the frame 17. The strength of the spring 87 is made to be low relative to the maximum operating force but sufficient to eliminate any mechanical play.

In order to deform the wall 59, an electromagnet 91, having a coil 92 and core 94, is provided adjacent a piece of magnetic material 93 that is attached to an upper end of the beam 79. The electromagnet 91 is energized through the circuits 47 that have previously been described with respect to FIG. 1. Enough electrical energy is provided to the electromagnet 91 in order to deform the wall 59 an amount that the frequency of the laser output is that which an operator has selected by setting the voltage of the source 41 or by adjusting the grating (FIG. 1). Since the wall 59 tends to want to return to its flat position, and thus exerts a force against the beam 79, the magnetic force exerted by the magnet 91 remains continuous and constant for the duration that a specific frequency output is desired from the dye cell.

The extent of an air gap 95 between the electromagnet 91 and magnetic piece 93 can be adjusted by hand though a screw 97. The screw 97 is positioned in an opening of the frame 17 and threadedly engages the electromagnet 91 so that the turning of the screw 97 will cause the magnet 91 to move back and forth along the axis of the screw. A spring 99 is provided to urge the electromagnet 91 away from the frame 17. The air gap 95 is adjusted so that it remains large compared with the displacements involved at the wall 59 to control the laser frequency, and therefore readily provides a force that is independant of any small dimensional differences between cells that might affect the position of the deformable wall 59 relative to the frame 17 and thus to the force applying mechanism.

Another feature of the cell 11 is its internal dye reservoir provided by a passage 101 that surrounds the mirror 55. The result of this specific exemplary design is that the mirror 55 is formed on the top of a post 103 extending from the floor of the reservoir 101. By this structure, the very small resonant cavity 51 is maintained, but that cavity is in continuous liquid communication with a much larger reservoir 101 that surrounds it. Some liquid circulation is provided between the cavity 51 and reservoir 101 as a result of the wall 59 being moved when the laser output frequency is changed. By this structure, no liquid communication from the cavity 51 to external sources of laser dye are required. Of course, such communication may be provided if it is necessary to run the laser for periods longer than the limited reservoir within the cell 11 will allow. However, the provision of enough of a reservoir within the cell 11 to permit substantially long periods of operation between dye changes is a significant advantage for simplicity and ease of use. When it is required to replace the dye within the cell, the cell is first removed from its attachment to the frame 17 by releasing the screws 13 and 15, and then the cell is taken apart by releasing the screws 67 and 69, as best shown in the exploded view of the cell shown in FIG. 3.

In order to assure proper registration of the cell 11 with the beam protrusion 83, a pair of registration pins 105 and 107 (FIG. 3) are preferably provided extending outward of the frame 17. Matching holes 109 and 111 (FIG. 4) are formed in the surface of the metal frame piece 65 of the cell 11 that contacts the frame 17. This also assures proper registration of the resonant cavity 51 with the pumping beam 25 for each newly replaced cell 11.

The preferred configuration and method of manufacturing the cell 11 can best be observed by reference to the exploded view of it given in FIG. 3. The opposing wall elements 57 and 59 are preferably made of glass since techniques for working with glass are highly developed. The element 57 is preferably made by starting with a thick, solid glass piece that is machined into a circular shape and with a very smooth surface which will form the top of the post 103 and an outside ring surface 104. The reservoir well 101 is then formed by machine into this very smooth surface. The partially transparent mirror is then formed on the resulting post 103 of a multi-dielectric coating. The spacer 61 is then formed around an outside edge of the surface 105 in a very controlled manner, a preferred technique being the deposition of a layer of silicon dioxide in exactly the thickness desired.

Although the various aspects of the present invention have been described with respect to a preferred embodiment, it will be understood that the invention is entitled to protection within the full scope of the appended claims.

It is claimed:

1. A dye laser system, comprising:
   a liquid laser dye containing cell that includes two opposing mirrors positioned therein at a predetermined fixed distance apart, thereby to form a resonant dye cavity therebetween, means responsive to a force applied from outside said cell for allowing the distance between said two opposing mirrors to be altered so long as the outside force remains applied, thereby to allow adjustment of the resonant frequency of said cell, and a liquid dye containing reservoir contained entirely within said cell and in liquid communication with said cavity, whereby the cell is self-contained,
   means for controllably applying said force to said cell, thereby to adjust the resonant frequency of said resonant dye cavity,
   means for removably mounting said cell in a position adjacent said force applying means in order to form an operable connection therebetween, whereby replacement of one specific cell for another can be accomplished, and
   means including a source excitation radiation directed toward said position adjacent the force applying means for causing dye in the resonant dye cavity to lase when the cell is mounted in said position, whereby output laser radiation is obtained from said dye cavity and has a frequency that is determined by said force applying means.

2. The dye laser system of claim 1 wherein the mirror distance altering means of said cell includes a resiliently deformable wall to which one of the mirrors is attached, and wherein said force applying means includes means for pushing said deformable cell wall inward of said cavity in a manner to shorten the distance between the opposing mirrors from said predetermined fixed distance, said deformable wall being characterized by returning to a position wherein said mirrors are spaced said predetermined fixed distance apart when the force is removed.

3. The dye laser system of claim 1 wherein the reservoir of said cell includes a wall of the cell that carries one of the mirrors in which a chamber is formed at a location substantially completely surrounding said mirror.

4. In an adjustable frequency laser including a cell containing laser dye and having opposing mirrors therein whose spacing is adjustable, thus forming a tunable resonant cavity therebetween, a source of excitation radiation directed through a wall of the cell into said cavity for causing the dye therein to lase at at least one frequency that is determined by the spacing between the mirrors, and means for adjusting the spacing of the mirrors, thereby to adjust said at least one frequency output, the improvement comprising:

one of said mirrors being mounted on a wall of said cell that is bendable and attached around an edge of said resonant cavity to cause said one of said mirrors to normally be a predetermined distance from the other mirror when not bent, and said means for adjusting the spacing of the mirrors includes means external of said cell for applying force to said wall from outside the cell in a manner to controllably bend the wall, whereby the spacing between the mirrors is adjustable in order to adjust the value of said at least one frequency.

5. The laser of claim 4 wherein the improved force applying means includes a beam having first and second locations separated a distance along a length of the beam, said beam being pivotably mounted at said first location and having an electromagnet position adjacent said second location to cause rotation of the beam about its pivot mount when the electromagnet is energized, and means intermediate of said first and second locations of said beam for connecting said beam to said bendable wall, whereby the spacing between the mirrors is controlled by energizing said electromagnet.

6. The laser of claim 5 wherein said bendable wall is additionally characterized by elastically restoring itself to a rest position so that its attached mirror is positioned said predetermined distance from the other mirror when force is removed from the bendable wall, and wherein said electromagnet is characterized by rotating said beam in a direction to deform said bendable wall into said cavity without said electromagnet physically contacting said beam.

7. The laser of claim 6 wherein said improvement additionally includes a resilient element attached to said beam in a manner to cause said connecting means between the beam and the bendable wall to contact the bendable wall and establish reliable contact to the wall.

8. The laser of claim 4 wherein said improvement additionally includes a reservoir of said dye provided as part of said cell in continuous liquid communication with said cavity between said mirrors and without any liquid communication paths extending outside said cell.

9. The laser of claim 8 wherein said reservoir includes a chamber formed in a wall of said cell that carries another of said mirrors and at a location surrounding said other mirror.

10. The laser of claim 4 wherein said cell is removeable by hand from connection with said deforming mechanism, thereby to allow exchanging cells having different dyes therein.

11. A laser dye cell, comprising:

a first wall carrying a first mirror on at least a portion of an inside surface thereof, a second wall held fixed with respect to said first wall and having a second mirror on at least a portion of an inside surface thereof and at a location directly opposite said first mirror, thereby forming a resonant cavity between said mirrors, said second wall being resiliently deformable by a force applied from outside said cell in a manner to control the distance between said first and second mirrors, thereby to adjust the frequency of resonance of said cavity, and means for removeably mounting said cell by hand on a mechanism that is operable to deform said second wall, thereby providing easy replacement of a laser dye cell on such a mechanism.

12. The laser dye cell according to claim 11, additionally including a reservoir of liquid laser dye provided as part of said cell in continuous liquid communication with said cavity between said mirrors.

13. The laser dye cell according to claim 12 wherein said reservoir is self-contained within the cell and without any path of liquid communication extending outside of said cell.

14. The laser dye cell according to claim 12, wherein said reservoir includes a chamber formed in said first wall and at a location surrounding said first mirror.

* * * * *